United States Patent Office 3,812,106
Patented May 21, 1974

---

3,812,106
3β - HYDROXY - 5α-CARDENOLIDES AND -BUFADIENOLIDES AND PROCESS FOR THEIR MANUFACTURE
Ulrich Stache, Hofheim, Taunus, Kurt Radscheit, Kelkheim, Taunus, Werner Fritsch, Neuenhain, Taunus, and Werner Haede, Hofheim, Taunus, Germany, assignors to Farbwerke Hoechst Aktiengesellschaft vormals Meister Lucius & Bruning, Frankfurt am Main, Germany
No Drawing. Filed July 6, 1971, Ser. No. 160,220
Claims priority, application Germany, July 7, 1970, P 20 33 599.3
Int. Cl. C07c *173/02, 173/04*
U.S. Cl. 260—239.57         2 Claims

ABSTRACT OF THE DISCLOSURE

A process for the manufacture of 3β-hydroxy-5α-cardenolides and 3β-hydroxy-5α-bufadienolides of the general Formula I

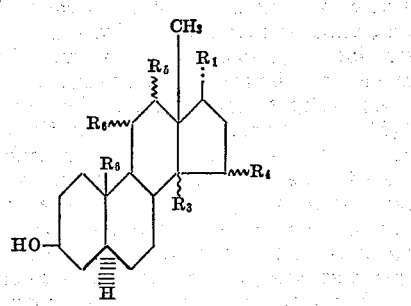

in which $R_1$ represents the butenolide ring or the α-pyrone ring

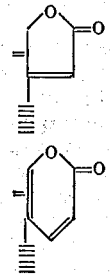

$R_2$ represents $CH_3$, $CH_2OH$ or

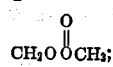

$R_3$ represents a hydrogen atom in α- or β-position or a hydroxy group which may be esterified; $R_4$ represents a hydrogen atom; or $R_3$ and $R_4$ together represent a 14(15)-double bond or an epoxy group in 14,15β- or 14,15α-position; $R_5$ and $R_6$ each represents a hydrogen atom or a hydroxy group in α- or β-position which may be esterified, which process comprises reducing 3-oxo-4(5)-dehydro-cardenolides or -bufadienolides of the general formula

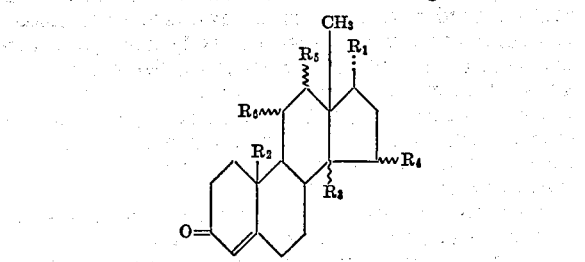

in which $R_1$, $R_2$, $R_3$, $R_4$, $R_5$ and $R_6$ have the meanings given above and $R_2$ may additionally represent the aldehyde group CHO, and $R_5$ and $R_6$ may represent the oxo group, with organometallic reducing agents or reducing agents having a similar effect, the reducing power of which are superior to that of sodium boron hydride, in the presence of organic nitrogen bases at temperatures of from −30° to +60° C.

Cardioactive 3β-hydroxy-5α-cardenolides and bufadienolides obtained by this process.

---

The present invention relates to 3β-hydroxy-5α-cardenolides and 3β-hydroxy-5α-bufadienolides and to a process for their manufacture.

It is already known that 3β-hydroxy-5α-cardenolides can be prepared by reducing 3-oxo-5α-cardenolides saturated in 4(5)-position with organometallic reducing agents, for example sodium boron hydride or lithium tributoxy aluminum hydride, in solvents which do not contain organic bases, without reducing the 17β-butenolide ring which is sensitive to reducing agents (Chem. Ber. *88*, p. 686 (1955); Liebig's Ann. Chemie *726*, p' 136 (1969)). Reductions of 3-oxo-4(5)-dehydro-cardenolides or -bufadienolides, which are carried out in a corresponding manner, do not yield the 3β-hydroxy-5α-analogs saturated in 4(5)-position but yield the 3β-hydroxy-4(5)-dehydro-cardenolides or -bufadienolides unsaturated in 4(5)-position (Liebig's Ann. Chemie *727*, p. 110 (1969). Tetrahedron Letters, p. 3033 (1969)).

A process, according to which β-hydroxy-5α-cardenolides or -bufadienolides are prepared in a single reaction step from 3-oxo-4(5)-dehydro-cardenolides or -bufadienolides, has not yet been disclosed. Although it is known that certain 3-oxo-4(5)-dehydro-steroids of the pregnane and androstane series, for example progesterone, and 11β-hydroxy-Δ⁴-androstene-3,17-dione, can be reduced in one step to the corresponding 3β-hydroxy-5α-steroids saturated in 4(5)-position with sodium boron hydride in the presence of pyridine (Tetrahedron Letters *15*, p. 193 (1961)), the corresponding reaction is useless in the case of 21-fluoro-progesterone. The attempt to reduce the corresponding 3-oxo-4(5)-dehydro-cardenolides and bufadienolides in the same manner with sodium boron hydride in pyridine to the corresponding 3β-hydroxy-5α-compounds has neither been successful.

The present invention now provides a process for the manufacture of 3β-hydroxy-5α-cardenolides and -bufadienolides of the general formula I

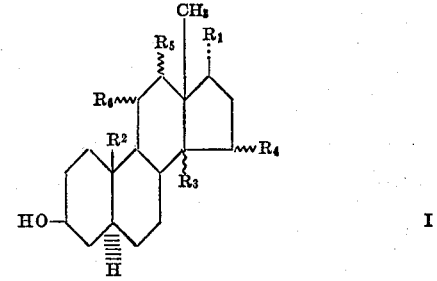

in which $R_1$ represents the butenolide ring or the α-pyrone ring

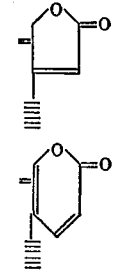

$R_2$ represents $CH_3$, $CH_2OH$, or $$CH_2O\overset{O}{\underset{\|}{C}}CH_3;$$

$R_3$ represents a hydrogen atom in α- or β-position or a hydroxy group which may be esterified; $R_4$ represents a hydrogen atom; or $R_3$ and $R_4$ together represent a 14(15)-double bond or epoxy group in 14,15β- or 14,15α-position; $R_5$ and $R_6$ each represents a hydrogen atom hydroxy group in α- or β-position which may be esterified or an oxo group. The process comprises reducing 3-oxo-4(5)-dehydro-cardenolides or -bufadienolides of the general formula

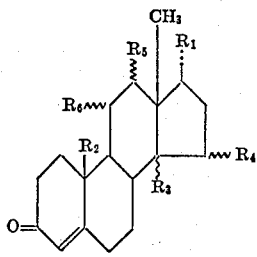

in which $R_1$, $R_2$, $R_3$, $R_4$, $R_5$ and $R_6$ have the meanings given above and $R_2$ may additionally represent the aldehyde group CHO, and $R_5$ and $R_6$ may represent the oxo group, with organometallic reducing agents or reducing agents having a similar effect, the reducing power of which is superior to that of sodium boron hydride, in the presence of organic nitrogen bases at temperatures of from −30° to +60° C.

In this process, it is surprising that the organometallic reducing agents having a superior reducing power do generally not affect the butenolide ring of cardenolides or the α-pyrone ring of bufadienolides, both in 17-position, which rings are necessary for a fully cardiac activity of the active ingredients. It must be borne in mind that the α-pyrone ring of bufadienolides is even less stable towards reducing agents than the butenolides ring of cardenolides. Furthermore, hydroxy groups, for example in 11-, 12-, 14- or 19-position, which may also be esterified, isolated double bonds, for example in 14(15)-position, or epoxy groups, for example in 14(15)-position, may be present without being altered under the reaction conditions. A possible aldehyde group in 19-position is generally reduced at the same time to the 19-alcohol group under the conditions of the present process. In the same manner, oxo groups which may be present in other positions, for example in 11- or 12-position, are also reduced to the corresponding alcohol groups.

As starting substances there may, for example be mentioned the following 3 - oxo - 4(5)-dehydro-cardenolides and bufadienolides which lead to the corresponding 3β-hydroxy-5α-cardenolides or -bufadienolides.

3-oxo-14α-carda-4,20(22)-dienolide→3β-hydroxy-5α,14-card-20(22)-endolide
3-oxo-carda-4,14,20(22)-trienolide (=14(15)-anhydrocanarigenone)→3β-hydroxy-5α-card-14,20(22)-dienolide (=14(15-anhydro-uzarigenin)
3-oxo-14-15β-oxido-carda-4,20(22)-dienolide→3β-hydroxy-14,15β-oxido-5α-card-20(22)-enolide
Carnarigenone→Uzarigenin
4(5-anhydro k-strophanthidone→coroglaucigenin
12β-hydroxy-carnarigenone→syriogenin
11β-hydroxy-canarigenone→mallogenin
3-oxo-14α-bufa-4,20,22-trienolide→3β-hydroxy-5α-14α-bufa-20,22-dienolide
3-oxo-bufa-4,14,20,22-tetraenolide (=14(15)-anhydroscillarenone)→3β-hydroxy-5α-bufa-14,20,22-trienolide (=14(15)anhydro-5α-bufalin)
3-oxo-14,15β-oxido-bufa-4,20,22-trienolide→3β-hydroxy-14,15β-oxido-5α-bufa-20,22-dienolide
3-oxo-14,15α-oxido-bufa-4-20,22-trienolide→3β-hydroxy-14,15α-oxido-5α-bufa-20,22-dienolide
Scillarenone→5α-bufalin
3-dehydro-scilliglaucosidine and 3-dehydro-scilliglaucosidin-ol→Bovogenol A
12β-hydroxy-scillarenone→12β-hydroxy-5α-bufalin The organo-metallic reducing agents preferably used are agents having a reducing power superior to that of sodium boron hydride, for example sodium trimethoxy boron hydride, lithium boron hydride, calcium boron hydride, strontium boron hydride, barium boron hydride, aluminum boron hydride, lithium trimethoxy boron hydride, magnesium boron hydride, zinc boron hydride, aluminum hydride, sodium aluminum hydride, magnesium aluminum hydride, lithium aluminum hydride, and lithium trimethoxy aluminum hydride, as well as diborane, pyridine-borane, ethane-1,2-diamine borane and mono- or bisalkyl boranes, such as, for example, mono-(-3-methyl-2-butyl) borane.

As inert solvents there may be used: Tetrahydrofuran, dioxan, diethyl ether, dimethylformamide acetonitrile and diglyme.

As organic bases there may be preferably mentioned according to the process of the invention: Pyridine, quinoline, ethylene-diamine, dimethyl-aniline, collidine, triethylamine, ethylamine, ethanol-amine, N-methyl-ethanolamine and N-dimethyl-ethanol-amine.

According to the invention, for example, the 3-oxo-4(5)-dehydro-cardenolide or -bufadienolide is dissolved in one of above organic bases, preferably pyridine, and one of the above inert solvents may be added, if necessary. Subsequently, one of the above organometallic reducing agents is added in a 1 to 100-fold molar excess, preferably a 5 to 40-fold molar excess, to the vigorously stirred solution, if necessary while cooling and dissipating the reaction heat produced. Alternatively, the organometallic reducing agent may be suspended or dissolved in one of the above organic bases, if necessary with addition of one of the above solvents, and then the steroid is added.

The reaction mixture is then stirred for 1 to 72 hours, preferably for 2 to 10 hours, at temperatures of from −20° to +30° C. When the reaction is complete, the excess of organo-metallic reagent is destroyed in the usual manner and the product is worked up in the usual manner by extraction with a suitable organic extracting agent. After elimination of the extracting agent by distillation, the products of the invention are generally obtained in a still impure and crude state. By the usual preparative chromatography on silica gel or aluminum oxide, the products of the invention can be obtained as compounds that are uniform according to the thin-layer chromatogram.

The products of the invention have valuable pharmacological properties, for example highly cardiotonic (positively inotropic) action, which is measured by potassium secretion or by a test on the atrium of an isolated heart of a Guinea pig as well as spasmolytic or diuretic properties.

Generally, the 3β-hydroxy-5α-cardenolides have a relatively weak positively inotropic action, but they develop a strong spasmolytic action on non-striated muscles. In contradistinction thereto, the 3β-hydroxy-5α-bufadienolides surprisingly show a high positively inotropic action and a diuretic activity. In particular, the 5α-isomer of the known bufalin, the 5α-bufalin, which has neither been found in nature nor synthesized, surprisingly exhibits a strong positively inotropic action which is substantially superior to that of digitoxine used for the treatment of cardiac atrophies.

The individual dose to be administered to human beings is from about 0.1 to 1 mg. per dosage unit.

The compounds of the invention are especially administered per os in the form of tablets, capsules or dragées, optionally in admixture or conjunction with the pharmaceutically suitable carriers, such as starch, lactose, tragacanth, magnesium stearate or talc. They may also be injected intravenously, a physiological sodium chloride solution or water serving as the solvent.

The following Examples serve to illustrate the invention.

EXAMPLE 1

(a) 200 mg. of lithium boron hydride were added portionwise at 22° C., while stirring, to a solution of 1.06 g. of 3-oxo-14α-carda-4,20(22)-dienolide in 14 ml. of absolute pyridine. After stirring had been continued for 6 hours at 0° C., the reaction mixture was cautiously poured into 100 ml. of semisaturated aqueous sodium chloride solution. The mixture was extracted with methylene chloride and the extracts were treated with 0.2–0.1 N aqueous hydrochloric acid. The product was then washed with water and dried and the solvents were distilled off in vacuo. The remaining oil (1.02 g.) was then chromatographed on silica gel [0.05–0.2 mm. "Merck"®, column size 3 x 25 cm.]. The product was first eluted with 950 ml. of methylene chloride and then with 500 ml. of methylene chloride +1% of methanol. After elimination of the solvents by distillation, 634 mg. of a solid residue were obtained from the last chromatography fraction (500 ml.). After recrystallization from acetone/diisopropyl ether, 485 mg. of 3β-hydroxy 5α,14α-card-20(22)-enolide were obtained, M.P. 210–212° C. Typical infrared bands (in KBr): 3450, 3120, 1780, 1745, 1730, 1620 cm.$^{-1}$.

(b) When, instead of lithium boron hydride, 80 mg. of diborane were slowly fed at 0° C. to the above reaction solution and the reaction was treated and worked up in a manner analogous to that disclosed in Example 1(a), the same product having the same characteristics as in Example 1(a) was obtained.

EXAMPLE 2

In a manner analogous to that disclosed in Example 1(a), 1.06 g. of 3-oxo-carda-4,14,20(22)-trienolide were reacted and worked up. After purification by chromatography, 3β-hydroxy-5α-carda-14,20(22)-dienolide was obtained, M.P. 251–253° C. Typical infrared bands (in KBr): 3440, 3100, 3055, 1795 (shoulder), 1775, 1750 (shoulder), 1720, 1620 cm.$^{-1}$.

EXAMPLE 3

A solution of 1.2 g. of 3-oxo-14β-hydroxy-carda-4,20 (22)-dienolide (=canarigenone) in 17 ml. of absolute pyridine was treated for 7 hours at 0° C. with 480 mg. of lithium boron hydride and worked up as disclosed in Example 1(a). After purification by chromatography, uzarigenin was obtained, M.P. 247–249° C. The characteristics of the ultraviolet and infrared spectra were completely indentical with the corresponding values of an authentic comparative preparation.

EXAMPLE 4

A solution of 600 mg. of 4(5)-anhydro-3-dehydro-K-strophanthidin in 9 ml. of absolute pyridine was treated for 7 hours at 0° C. with 240 mg. of lithium boron hydride and worked up as disclosed in Example 1(a). After analogous working up and chromatography on silica gel, coroglaucigenin was obtained, M.P. 248–252° C. The characteristics of the ultraviolet and infrared spectra were completely identical with the corresponding values of an authentic comparative preparation.

The same product was obtained by reacting in the same manner the 4(5)-anhydro-3-dehydro-K-strophanthidol instead of the 4(5)-anhydro-3-dehydro-K-strophanthidin.

EXAMPLE 5

A solution of 750 mg. of 3-oxo-bufa-4,14,20,22-tetraenolide (=14-anhydro-scillarenone) in 15 ml. of absolute pyridine was treated for 7 hours at 0° C. with 250 mg. of lithium boron hydride and worked up as disclosed in Example 1(a). After purification by chromatography, crystallized 3β-hydroxy-5α-bufa-14,20,22-trienolide (=14-anhydro-5α-bufalin) was obtained from the precipitated oily residue of the last chromatography fraction after digesting with ether. Typical infrared bands (in KBr): 3490, 3450 (shoulder), 1740, 1715, 1630, 1530 cm.$^{-1}$.

EXAMPLE 6

5α-bufalin (a) A solution of 750 mg. of scillarenone in 15. ml. of absolute pyridine was treated for 7 hours at 0° C. with 450 mg. of lithium boron hydride and worked up as disclosed in Example 1(a). After purification by chromatography on silica gel (as in Example 1(a), except that 2%, instead of 1%, of methanol were added as eluant to the chloroform) and after elimination of the eluant, CHCL$_3$: CH$_3$OH=98:2, a crystallized residue was obtained which was recrystallized from acetone/ether. 3β, 14β-dihydroxy-5a-bufa-20,22 - dienolide (5α-bufalin) was obtained, M.P. 230–234° C.

(b) (The following reaction steps starting from 14-anhydro-5α-bufalin and yielding 5α-bufalin were carried out in exactly the same manner as disclosed in Belgian Pat. No. 732,210.)

A mixed anhydride of formic acid and acetic acid was slowly added dropwise, while intensely stirring and cooling the reactor, to a solution of 370 mg. of the 14-anhydro-5α-bufalin obtained according to Example 5 in 1.9 ml. of absolute pyridine. (Preparation of the anhydride: 1.33 ml. of acetic anhydride were slowly added dropwise, while cooling with ice, to 5.5 ml. of a 100% formic acid. The mixture was then allowed to react for 15 minutes at 50° C., and then cooled to +5° C. The mixed anhydride thus obtained was used at once.)

During the dropwise addition of the anhydride reagent the temperature in the reaction mixture did not exceed 15° C. After the addition, the reaction mixture was stirred for another hour at 23° C. and then mixed with about 100 ml. of water, whereupon a crystalline precipitate separated. The precipitate obtained was suction-filtered, washed with water and dried in vacuo. 353 mg. of 14-anhydro-5α-bufalin-3-formiate were obtained. Typical infrared bands (in KBr): 1745, 1720, 1635, 1535, 1175 cm.$^{-1}$ (no more hydroxyl bands present). The product could be used for the subsequent reaction step without purification.

For preparing the 15α-, 14β-bromohydrin (=15α-bromo-5α-bulfalin-3-formate) a solution of 350 mg. of the crude 14-anhydro-5α-bufalin-3-formate obtained above in 11 ml. of dioxan was combined while cooling with ice and stirring with a mixture of glacial acetic acid and 2.0 ml. of water. Then 200 mg. of freshly recrystallized N,N-dibromobenzene sulfonamide were introduced into the carefully stirred mixture. After stirring for 1 hour, while cooling with ice, the mixture was poured onto 100 ml. of ice water. After extraction with methylene chloride, the extracts were washed with water and dried over sodium sulfate. After elimination of the solvents by distillation, a foam was obtained which gave a strongly positive Beilstein test for halogen and was immediately used for the subsequent reaction step. For this purpose, the crude 15α-14β-bromohydrin obtained was dissolved in 20 ml. of methylene chloride and this solution was mixed while stirring with a suspension of a nickel catalyst obtained from 13 g. of moist Raney nickel as hereinafter disclosed. After stirring with for 3.5 hours at 23° C. the catalyst was separated by filtration. The solvent was eliminated by distillation and the dry residue obtained (205 mg.) was dissolved in 4 ml. of absolute methanol for hydrolysis of the 3-formate group. After the addition of 1.8 ml. of absolute methanol saturated with ammonia gas, the reaction mixture was allowed to stand for 18 hours at O° C. Subsequently, it was concentrated in vacuo until it was dry. The solid residue was taken up in about 30 ml. of methylene chloride. The solution was washed twice with water, dried over sodium sulfate, and methylene chloride was distilled off in vacuo. The residue obtained was chromatographed on silica gel "Merck"® (column size 3 x 21 cm.). It was first eluated with 2500 ml. of chloroform and then with 1000 ml. of chloroform/methanol (98:2). After elimination of the solvents by distillation from the latter eluate, a crystallized residue was obtained which was recrystallized from acetone/ether. 5α-bufalin was obtained, M.P. 231–235° C; no depression with the 5α-bufalin prepared according to Example 6(b). The infrared spectra were also indentical.

Preparation of the catalyst 13 g. of water-moist Raney nickel were carefully whirled about for some seconds three times with 130 ml. of water each, and the supernatant water was decanted after the Raney nickel had deposited. The same operation was repeated three times using 20 ml. of methanol each time. After the decanting of the last supernatant methanol, 20 g. of a methanol-moist Raney nickel paste were obtained which had a volume of about 10 ml., corresponding to an amount of about 6.8 g. of dry Raney nickel.

EXAMPLE 7

In a manner analogous to Example 1(a), 1.1 g. of 3-oxo-14α-bufa-4,20,22-trienolide (prepared in known manner by the usual Oppenauer oxidation from 3β-hydroxy-14α-bufa-5,20,22-trienolide) were reacted in 14 ml. of pyridine with 200 mg. of lithium boron hydride for 6 hours at 0° C. and worked up. After chromatography on silica gel, 312 mg. of 3β-hydroxy-5α, 14α-bufa-20,22-dienolide were obtained after digesting with diisopropyl ether, M.P. 241–247° C. Typical infrared bands (in KBr): 3470, 1740, 1715, 1630, 1530 cm.$^{-1}$.

EXAMPLE 8

In a manner analogous to Example 1(a) 550 mg. of 3-oxo-14,15β-oxido-bufa-4,20,22-trienolide in 7 ml. of pyridine were reacted with 100 mg. of lithium boron hydried for 6 hours at 0° C. and the reaction product was worked up. After chromatography on silica gel, 3β-hydroxy-14,15β-oxido - 5α - bufa-20,22-dienolide was obtained after digesting with diisopropyl ether, M.P. 248–253° C.

EXAMPLE 9

In a manner analogous to Example 1(a) 100 mg. of 3-dehydro-scilliglaucosidin in 1.5 ml. of pyridine were reacted with 30 mg. of lithium boron hydride for 7 hours at 0° C. and the product was worked up. After chromatography on silica gel and elution with 200 ml. of chloroform/methanol (96:4), 23 mg. of Bovogenol A were obtained after recrystallization from acetone/ether, M.P. 261–263° C.

What we claim is:

1. The method of making a 3β-hydroxy-5α-cardenolide or a 3β-hydroxy-5α-bufadienolide of the formula

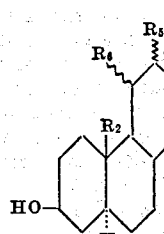

wherein

R$_1$ is

or

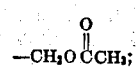

R$_2$ is —CH$_3$, —CH$_2$OH, or —CH$_2$OCCH$_3$;

R$_3$, taken alone, is α- or β-hydrogen or hydroxy, which may be esterified;
R$_4$, taken alone, is hydrogen;
R$_3$ and R$_4$, taken together, are a 14(15)-double bond or a 14,15β- or 14,15α epoxy group;
R$_5$ is hydrogen or α- or β-hydroxy, which may be esterified;
R$_6$ is hydrogen or α- or β-hydroxy, which may be esterified;

which method comprises contacting a 3-oxo-4(5)-dehydro-cardenolide or 3-oxo-4(5)-dehydro-bufadienolide of the formula

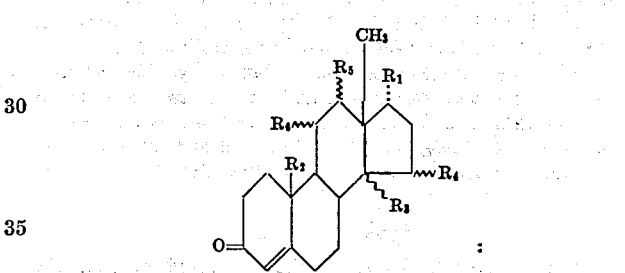

wherein R$_1$, R$_2$, R$_3$, R$_4$, R$_5$, and R$_6$ have their earlier meanings; R$_2$ may additionally be —CHO; and R$_5$ and R$_6$ may additionally be oxo, in an organic nitrogen base at a temperature from —30° C. to 60° C., with an organo-metallic reducing agent having a reducing power greater than that of sodium boron hydride, said agent being selected from the group consisting of sodium trimethoxy boron hydride, lithium boron hydride, calcium boron hydride, strontium boron hydride, barium boron hydride, aluminum boron hydride, lithium trimethoxy boron hydride, magnesium boron hydride, zinc boron hydride, aluminum hydride, sodium aluminum hydride, magnesium aluminum hydride, lithium aluminum hydride, lithium trimethoxy aluminum hydride, diborane, pyridine-diborane, ethane-1,2-diamine borane, and mono- and bis-alkyl boranes.

2. 3β-hydroxy-14,15β-oxido-5α-bufa-20,22-dienolide.

References Cited

UNITED STATES PATENTS 3,682,895   8/1972   Pettit et al. _____ 260—239.57

OTHER REFERENCES

Pettit et al.: Canadian Journal of Chemistry (1969), vol. 47, pp. 2511–2512.
Pettit et al.: Jour. of Org. Chem. (May 1970), pp. 1392.

ELBERT L. ROBERTS, Primary Examiner

U.S. Cl. X.R.

424—241